P. V. ELLIOTT.
VERTICAL COLLISION BUMPER.
APPLICATION FILED JUNE 25, 1921.

1,392,001. Patented Sept. 27, 1921.

INVENTOR:
Pearl V. Elliott
BY Walter A. Knight
ATTORNEY.

UNITED STATES PATENT OFFICE.

PEARL V. ELLIOTT, OF NORWOOD, OHIO.

VERTICAL COLLISION-BUMPER.

1,392,001.   Specification of Letters Patent.   Patented Sept. 27, 1921.

Application filed June 25, 1921. Serial No. 480,456.

*To all whom it may concern:*

Be it known that I, PEARL V. ELLIOTT, a citizen of the United States, residing at Norwood, in the county of Hamilton and State of Ohio, have invented new and useful Improvements in Vertical Collision-Bumpers, of which the following is a specification.

My invention relates to vertical collision bumpers for vehicles and is especially adapted for use on the rear end of automobiles.

Practically all automobiles, particularly pleasure cars, are provided with bumpers on the front end, consisting essentially of a horizontal bar of some sort disposed in such a manner as to cushion and break the force of the shock due to collision between the vehicle and any other object.

Though my invention could be readily applied to the front end of a vehicle, it will be most valuable when used on the rear end. As my improvements consist of a pair of vertically disposed bumpers, they will be completely effective when a collision occurs from the rear where the colliding machine in the rear has horizontal bumpers of any type.

The principal object of my invention is to provide an improved vertical bumper which will be inexpensive to manufacture, easy to apply to the vehicle, strong and durable, and of pleasing appearance.

In the particular embodiment of my invention selected for illustration:

Figure 1:
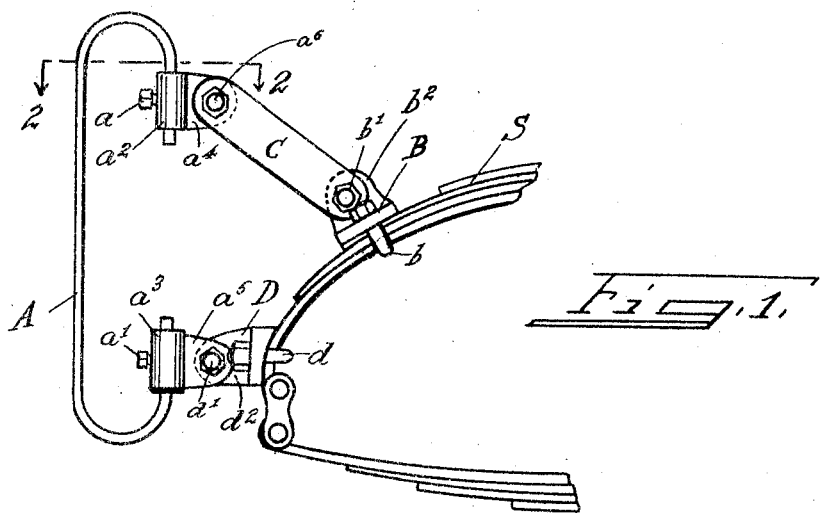
Figure 1 is a side elevation of one of the devices applied to the rear spring of an automobile.
Figure 2:
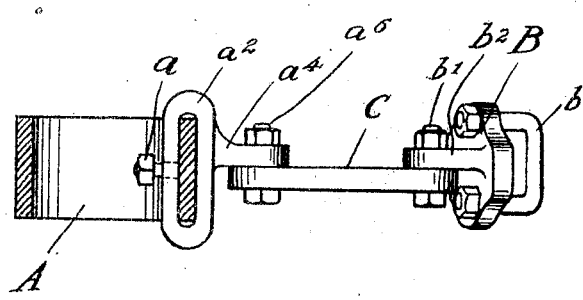
Fig. 2 is a section on the line 2—2 of Fig. 1 through the rearward portion of the bumper spring and a plan view of the remainder of the top connection only.
Figure 3:
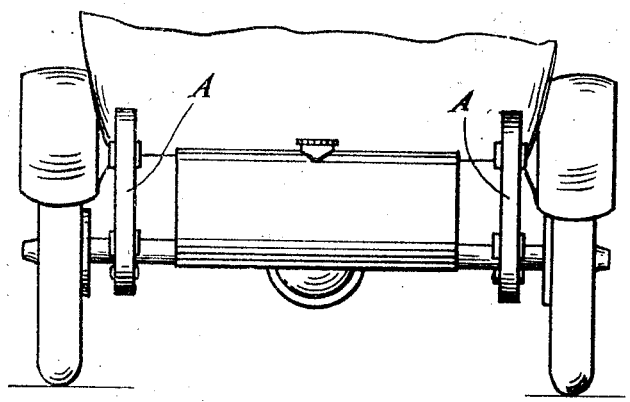
Fig. 3 shows a pair of these bumpers in position on the rear of an automobile.

Referring now to the drawings, A, the bumper proper, is a resilient piece of metal made in whatever form is desired, the particular form shown in the drawings being the best known to me, affording the greatest resilience, the least danger of marring anything with which it comes in contact, and the least danger of hooking onto or becoming entangled with any other object.

To an upper portion of this resilient member A, is secured by the cap screw $a$, or in any other convenient manner, a sleeve $a^2$ bearing a lug $a^4$ with a bolt-hole therethrough. To a lower portion of the resilient member A, a similar sleeve $a^3$ is secured by the cap screw $a^1$ having a lug $a^5$ with a bolt-hole therethrough. These sleeves are adjustable for convenience in setting resilient bumper proper A to the proper height.

To the spring S or any convenient part extending from the chassis, is secured by a U-bolt $b$, a connection B provided with a lug $b^2$ with bolt-hole therethrough. The lug $a^4$ and lug $b^2$ are connected by a link C and the bolts $a^6$ and $b^1$. To another place on the spring S or other convenient extension from the vehicle, is secured by U-bolt $d$, a connection D with a lug $d^2$ with a bolt-hole therethrough. The lugs $a^5$ and $d^2$ are secured to each other by the bolt $d^1$. The normal vertical position of the resilient member A is secured by using links C and lugs $a^5$ and $d^2$ of proper length. Obviously if the shape and position of the part or parts extending from the chassis to which the bumper connections are attached, makes it more convenient, the link may be below and the lugs without link above.

I conceive to be within the scope of my invention any form of vertical bumper which has a pivotal connection with the chassis or extension therefrom so as to coöperate with the resilience of the bumper proper.

I claim as my invention and desire to secure by Letters Patent of the United States:—

1. A vertical collision bumper adapted normally to be mounted in pairs, each bumper having in combination a resilient member to receive the impact of collision, and means for pivotally connecting said resilient member with the vehicle at two points one above the other.

2. A vertical collision bumper having in combination a resilient member to receive the impact of collision, two vertically adjustable means, one above the other, for gripping said resilient member, means for pivotally connecting said upper gripping means to the vehicle and means for pivotally connecting said lower gripping means to the vehicle at a lower point.

3. A vertical collision bumper having in combination a resilient member to receive the impact of collision, two vertically adjustable means, one above the other, for gripping said resilient member, means for pivotally connecting said upper gripping means to the vehicle and means for pivotally connecting said lower gripping means to the vehicle at a lower point, one of the means for connecting a gripping means to its vehicle connection having a link.

4. A vertical collision bumper having in combination, a resilient member to receive the impact of collision, an adjustable connection toward the upper part of said resilient member and another toward the lower part; two adjustable connections one above the other to secure the device to the vehicle, a link pivoted at one end to one of said resilient member connections, and at the other end to the corresponding vehicle connection, and the other resilient member connection pivoted direct to the other vehicle connection.

5. A vertical collision bumper having in combination, a resilient member having terminals bent into substantially parallel relations with its normal impact surface, an adjustable connection toward the upper part of said resilient member and another toward the lower part; two adjustable connections one above the other to secure the device to the vehicle, a link pivoted at one end to one of said resilient member connections, and at the other end to the corresponding vehicle connection, and the other resilient member connection pivoted direct to the other vehicle connection.

In testimony whereof I have hereunto set my hand in presence of two subscribing witnesses.

PEARL V. ELLIOTT.

Witnesses:
NORMA D. BERGER,
CARL PHARES.